(12) United States Patent
Chung

(10) Patent No.: US 7,501,954 B1
(45) Date of Patent: Mar. 10, 2009

(54) DUAL CIRCUIT RF IDENTIFICATION TAGS

(75) Inventor: Kevin Kwong-Tai Chung, Princeton, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 957 days.

(21) Appl. No.: 10/872,080

(22) Filed: Jun. 18, 2004

Related U.S. Application Data

(63) Continuation-in-part of application No. 10/398,363, filed as application No. PCT/US01/42563 on Oct. 9, 2001, now Pat. No. 7,098,793.

(60) Provisional application No. 60/239,293, filed on Oct. 11, 2000, provisional application No. 60/239,649, filed on Oct. 12, 2000, provisional application No. 60/240,748, filed on Oct. 16, 2000, provisional application No. 60/243,640, filed on Oct. 26, 2000, provisional application No. 60/245,596, filed on Nov. 3, 2000, provisional application No. 60/248,454, filed on Nov. 14, 2000, provisional application No. 60/260,849, filed on Jan. 10, 2001, provisional application No. 60/303,994, filed on Jul. 6, 2001, provisional application No. 60/304,017, filed on Jul. 9, 2001, provisional application No. 60/305,686, filed on Jul. 16, 2001, provisional application No. 60/323,514, filed on Sep. 19, 2001, provisional application No. 60/480,834, filed on Jun. 20, 2003, provisional application No. 60/505,265, filed on Sep. 22, 2003.

(51) Int. Cl.
*G08B 13/14* (2006.01)

(52) U.S. Cl. ............... 340/572.7; 340/10.1; 340/572.8

(58) Field of Classification Search ... 340/572.1–572.9, 340/5.61, 10.1–10.6; 235/492
See application file for complete search history.

(56) References Cited

U.S. PATENT DOCUMENTS

| | | | |
|---|---|---|---|
| 3,671,721 A * | 6/1972 | Hunn et al. | 235/439 |
| 4,029,945 A * | 6/1977 | Yamada et al. | 235/488 |
| 4,583,099 A | 4/1986 | Reilly et al. | |
| 4,752,680 A * | 6/1988 | Larsson | 235/492 |
| 5,119,070 A * | 6/1992 | Matsumoto et al. | 340/572.5 |
| 5,307,349 A * | 4/1994 | Shloss et al. | 370/442 |
| 5,404,581 A | 4/1995 | Honjo | |
| 5,430,441 A | 7/1995 | Bickley et al. | |
| 5,519,201 A | 5/1996 | Templeton, Jr. et al. | |
| 5,541,399 A | 7/1996 | de Vall | |
| 5,574,470 A | 11/1996 | de Vall | |
| 5,598,032 A | 1/1997 | Fidalgo | |
| 5,604,485 A * | 2/1997 | Lauro et al. | 340/572.5 |
| 5,690,773 A | 11/1997 | Fidalgo et al. | |
| 5,751,256 A | 5/1998 | McDonough et al. | |
| 5,767,503 A | 6/1998 | Gloton | |
| 5,847,931 A | 12/1998 | Gaumet et al. | |
| 5,859,587 A * | 1/1999 | Alicot et al. | 340/572.8 |
| 5,880,934 A | 3/1999 | Haghiri-Tehrani | |
| 5,892,661 A | 4/1999 | Stafford et al. | |
| 5,903,239 A | 5/1999 | Takahashi et al. | |
| 5,909,050 A | 6/1999 | Furey et al. | |
| 6,018,299 A | 1/2000 | Eberhardt | |

(Continued)

*Primary Examiner*—George A Bugg
(74) *Attorney, Agent, or Firm*—Dann, Dorfman, Herrell & Skillman, PC; Clement A. Berard, Esq.

(57) ABSTRACT

A wireless article includes two or more RFID electronic devices and antenna that operate at or under different conditions, e.g., at different frequencies and/or under different protocols.

38 Claims, 7 Drawing Sheets

U.S. PATENT DOCUMENTS

| | | |
|---|---|---|
| 6,049,461 A | 4/2000 | Haghiri-Tehrani et al. |
| 6,088,901 A | 7/2000 | Huber et al. |
| 6,100,804 A | 8/2000 | Brady et al. |
| 6,104,278 A * | 8/2000 | Altwasser ................ 340/572.1 |
| 6,107,920 A | 8/2000 | Eberhardt et al. |
| 6,133,833 A * | 10/2000 | Sidlauskas et al. ....... 340/572.1 |
| 6,161,761 A | 12/2000 | Ghaem et al. |
| 6,181,278 B1 | 1/2001 | Kakimoto et al. |
| 6,384,727 B1 | 5/2002 | Diprizio et al. |
| 6,421,013 B1 | 7/2002 | Chung |
| 6,600,420 B2 | 7/2003 | Goff et al. |
| 6,606,247 B2 | 8/2003 | Credelle et al. |
| 6,665,193 B1 | 12/2003 | Chung et al. |
| 6,806,812 B1 * | 10/2004 | Cathey .................... 340/572.7 |
| 6,951,596 B2 * | 10/2005 | Green et al. ................ 156/264 |
| 6,952,167 B2 * | 10/2005 | Wakabayashi ........... 340/572.5 |
| 7,016,311 B2 * | 3/2006 | Tiernay et al. .............. 370/252 |
| 7,107,019 B2 * | 9/2006 | Tandy ...................... 455/90.3 |
| 2001/0048361 A1 * | 12/2001 | Mays et al. .............. 340/10.51 |

* cited by examiner

DUAL CIRCUIT RF IDENTIFICATION TAGS

This application is a continuation-in-part of U.S. patent application Ser. No. 10/398,363 filed Apr. 1, 2003 now U.S. Pat. No. 7,098,793, which is the National Stage of PCT International Application No. PCT/US01/42563 filed Oct. 9, 2001, which claims the benefit of:

U.S. Provisional Application Ser. No. 60/239,293 filed Oct. 11, 2000,

U.S. Provisional Application Ser. No. 60/239,649 filed Oct. 12, 2000,

U.S. Provisional Application Ser. No. 60/240,748 filed Oct. 16, 2000,

U.S. Provisional Application Ser. No. 60/243,640 filed Oct. 26, 2000,

U.S. Provisional Application Ser. No. 60/245,596 filed Nov. 3, 2000,

U.S. Provisional Application Ser. No. 60/248,454 filed Nov. 14, 2000,

U.S. Provisional Application Ser. No. 60/260,849 filed Jan. 10, 2001,

U.S. Provisional Application Ser. No. 60/303,994 filed Jul. 6, 2001,

U.S. Provisional Application Ser. No. 60/304,017 filed Jul. 9, 2001,

U.S. Provisional Application Ser. No. 60/305,686 filed Jul. 16, 2001,

U.S. Provisional Application Ser. No. 60/323,514 filed Sep. 19, 2001, and U.S. patent application Ser. No. 09/854,722 filed May 14, 2001, and this application further claims the benefit of:

U.S. Provisional Application No. 60/480,834 filed Jun. 20, 2003, and of

U.S. Provisional Application No. 60/505,265 filed Sep. 22, 2003, all of which are hereby incorporated herein by reference in their entirety.

The present invention relates to radio frequency identification and, in particular, to radio frequency identification at or under two different conditions.

Radio frequency identification (RFID) tags are coming into prominence as the technology of choice for labeling and actively tracking of objects either in a given facility or locale or in transit or both. RFID tags, which may take many physical forms, typically comprise a substrate on which are provided an electronic device and an antenna. The electronic device typically includes an electronic memory and a processor, and each may be relatively simple or relatively sophisticated. Suitable RFID electronic devices are available commercially from several manufacturers.

Information stored in the memory of an RFID tag may be read when the tag is in proximity to a tag reader and information may be written to the tag memory when the tag is proximate to a to tag writer. Typically, a tag reader and a tag writer may be combined in one apparatus that both receives information from the RFID tag and transmits information to the RFID tag.

Typically, RFID tags transmit and receive data on a frequency in a particular frequency band, among which are 13.56 MHz, 915 MHz, and 2.45 Ghz; although the actual frequency may be at any frequency in a band including the named frequency. For example, "operation at 915 MHz" may be at any frequency in a band of frequencies between 890 MHz and 920 MHz. The transmit and receive frequency is fixed and is typically determined by the circuitry of the electronic device, with the antenna being configured to be compatible therewith. Each frequency and electronic device has desirable and undesirable attributes, and various ones are preferred for different applications. Similarly, electronic devices operating under different communication protocols are utilized for different applications. For example, an RFID tag or card can employ an RFID device operating under a protocol that enables a tag and reader to communicate over a distance of about 1-2 meters (about 3-6 feet), and perhaps as far as 9-10 meters (about 30-33 feet), as is appropriate for low security applications such as access to parking yards and the like, which is an undesirably long distance for a secure transaction, such as for a financial transaction at an ATM or other terminal, in which case an RFID device employing a different protocol that requires a tag or card to be within about 2.5-12.5 cm (about 1-5 inches) of the reader is desirable.

A problem arises when different frequency devices are employed for similar applications in different situations. For example, for the control and tracking of baggage in transit, as for airline transport, certain entities in the United States are reportedly considering tags operating at either 915 MHz or 2.45 GHz while other entities in Europe and other parts of the world are considering tags operating at 13.56 MHz. As a result, incompatibilities may exist between the baggage tracking and other systems at the origin and/or at the destination or any other point of use.

A similar problem arises when devices operating under different communication protocols, even if at the same frequency, are employed for similar applications in different situations. Among the protocols in use are ISO-114443 and ISO-15963, both of which are promulgated by the International Standards Organization, as well as proprietary protocols of various sources of RFID devices. RFID devices operating under different protocols may also be incompatible and not operable with each other. In addition, there may be differences between RFID devices operating under the same protocol if obtained from different manufacturers.

Thus, either an incompatibility will exist that will render the baggage tracking or other systems ineffective or plural tags will be needed, e.g., one at each of the plural operating frequencies or for each of the communication protocols.

Likewise, where a person has more than one RFID card or tag for various purposes, e.g., one for access to a parking yard and another for banking, secure entry or other transactions, carrying plural cards is inconvenient. Prior attempts to combine two RFID circuits in a single RFID smart card or tag have been unsuccessful because the two RFID devices and their antennas have interfered or shielded each other which drastically reduced the distance at which they could be read by an RFID tag reader.

In one example thereof, when a Mifare RFID chip and an I-Code RFID chip, both of which operate at 13.56 MHz and are from the same manufacturer, were attached to a standard seven-turn loop antenna on a 2×3 inch RFID tag, the read distance for the I-Code chip decreased from about 36 inches (about 0.9 meter) to less than five inches (less than about 0.1 m) and the read distance for the Mifare chip decreased from about five inches (about 12.7 cm) to less than one inch (less than about 2.5 cm). Such loss of read distance typically renders the RFID tag not usable.

Accordingly, there is a need for a wireless article that can operate with two or more RFID devices at or under two or more different conditions.

To this end, a wireless article may comprise a dielectric substrate; at least one antenna on the dielectric substrate, said at least one antenna including at least one loop and at least first and second contacts thereof; and at least two RFID electronic devices disposed proximate the dielectric substrate and electrically connected to first and second contacts of the antenna, wherein the at least two RFID electronic devices operate under different protocols and/or at different frequencies.

BRIEF DESCRIPTION OF THE DRAWING

The detailed description of the preferred embodiment(s) will be more easily and better understood when read in conjunction with the FIGURES of the Drawing which include.

Figure 1:
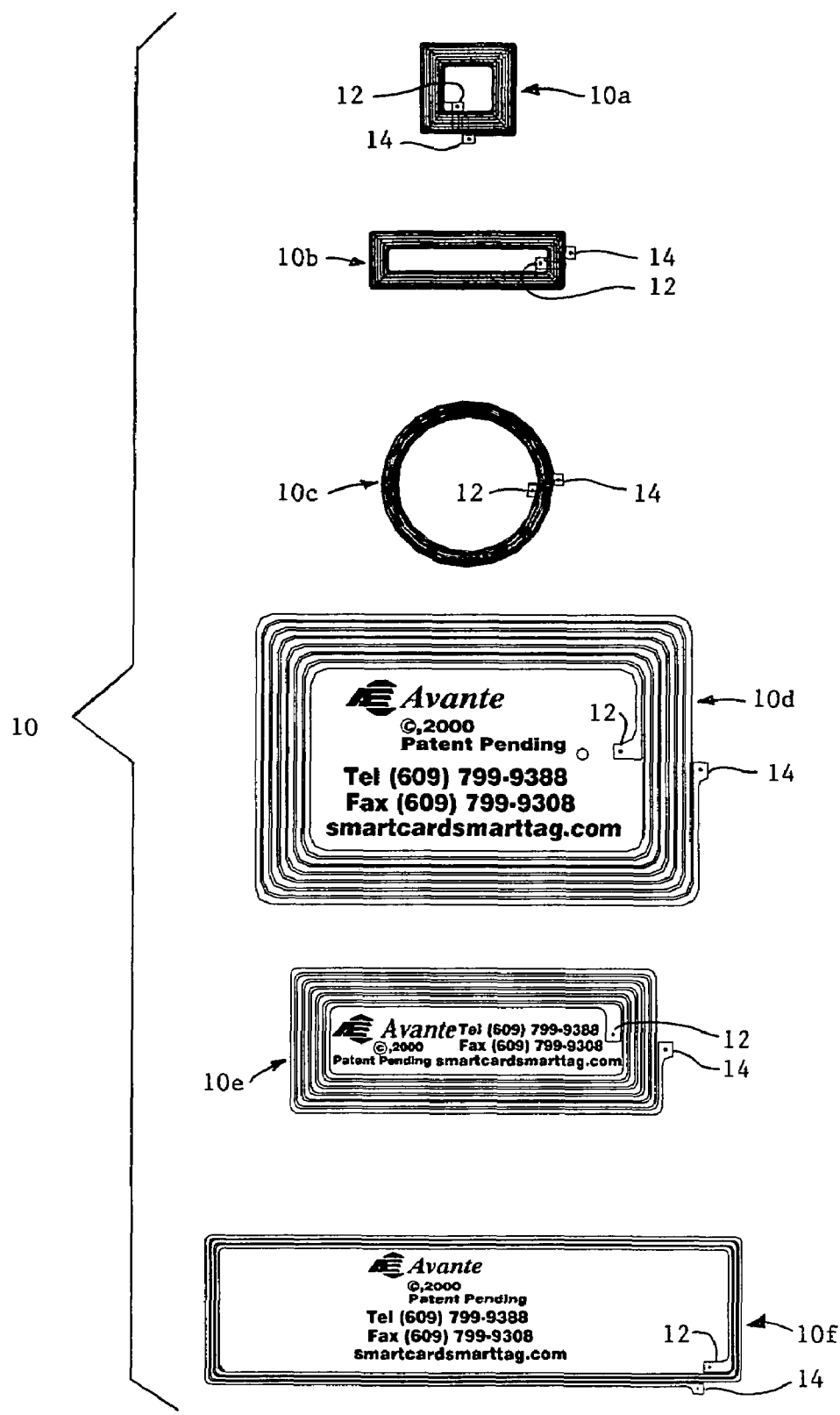
FIG. 1 is a schematic diagram of various prior art wireless article antenna arrangements operable at a single frequency.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. For example, a particular element may be designated as "xx" in one figure, by "1xx" in another figure, by "2xx" in another figure, and so on. It is noted that, according to common practice, the various features of the drawing are not to scale, and the dimensions of the various features are arbitrarily expanded or reduced for clarity.

DESCRIPTION OF THE PREFERRED EMBODIMENT(S)

FIG. 1 is a schematic diagram of various prior art wireless article antenna arrangements 10 operable at a single frequency. Each of antenna arrangements 10 is typically provided on an insulating substrate that is slightly larger than the outer dimensions of the antenna arrangement.

Antenna arrangement 10a is typically employed to identify or in conjunction with a label for a relatively small article, such as a medication container, and is typically about 1.5 by 1.5 cm (about 0.6 by 0.6 inch) in size. A tag including antenna arrangement 10a is readable at a distance of more than about 20 cm (about 8 inches).

Antenna arrangement 10b is typically employed to identify or in conjunction with a label for a long narrow article, such as a medical syringe, and is typically about 3.3 by 1 cm (about 1.3 by 0.4 inch) in size. A tag including antenna arrangement 10b is readable at a distance of more than about 20 cm (about 8 inches).

Antenna arrangement 10c is typically employed to identify or in conjunction with a label for an article, such as a DVD or CD disk, and is typically about 2.9 cm (about 1.15 inches) in diameter. A tag including antenna arrangement 10c is readable at a distance of more than about 34 cm (about 13.5 inches).

Antenna arrangement 10d is typically employed to identify or in conjunction with a label for an article, such as a luggage tag, identification badge, smart card or other card, and is typically about 5.1 by 7.6 cm (about 2 by 3 inches) in size. A tag including antenna arrangement 10d is readable at a distance of more than about 91 cm (about 36 inches), i.e. almost one meter. Such smart card or other card is of a size similar to a credit card or access card that may be carried by a person Antenna arrangement 10e is typically employed to identify or in conjunction with a label for a relatively larger article, such as baggage, luggage, packages or other items, and is typically about 5.1 by 12.7 cm (about 2 by 5 inches) in size. A tag including antenna arrangement 10e is readable at a distance of more than about 101 cm (about 40 inches), i.e. over one meter.

Antenna arrangement 10f is typically employed to identify or in conjunction with a label for a relatively larger article, such as a tote, pallet or other container, and is typically about 27.4 by 7.9 cm (about 10.8 by 3.1 inches) in size. A tag including antenna arrangement 10f is readable at a distance of more than about 152 cm (about 60 inches), i.e. over 1.5 meters (five feet).

Each of antenna arrangements 10a-10f includes a plurality of turns of a conductor to provide a loop antenna and a pair of contacts or connection locations 12, 14 of the loop antenna 10a-10f at which an electronic device (not shown) is connected. The electronic device may be mounted to the opposing broad surface of the substrate on which the loop conductor is provided, in which case vias or connections through the substrate are provided. Alternatively, the electronic device may be included on an electronic jumper that connects between contacts 12 and 14.

Typical electronic devices employed with antenna arrangements 10a-10f include, for example, electronic chips such as types SLE44R35S, SLE4442, SLE4428, SLE55R16, SRF5502P, SRF55V10S, SLE66CLX320P available from Infineon, formerly Siemens, of Germany, electronic chips available from Atmel Corporation, of Colorado, the "I-Code" and "I-Code 2" and "Mifare" electronic chips available from Philips, of the Netherlands, and the Tagit chips available from Texas Instruments, of Dallas, Tex., as well as RFID chips from Inside Technology, of France, and EM Microelectronic Marin, of Switzerland.

With the foregoing single purpose RFID tags or cards, one might have to keep and utilize plural tags in order to conduct transactions and/or tracking and/or monitoring at one or more sites and/or under differing circumstances.

Figure 2:
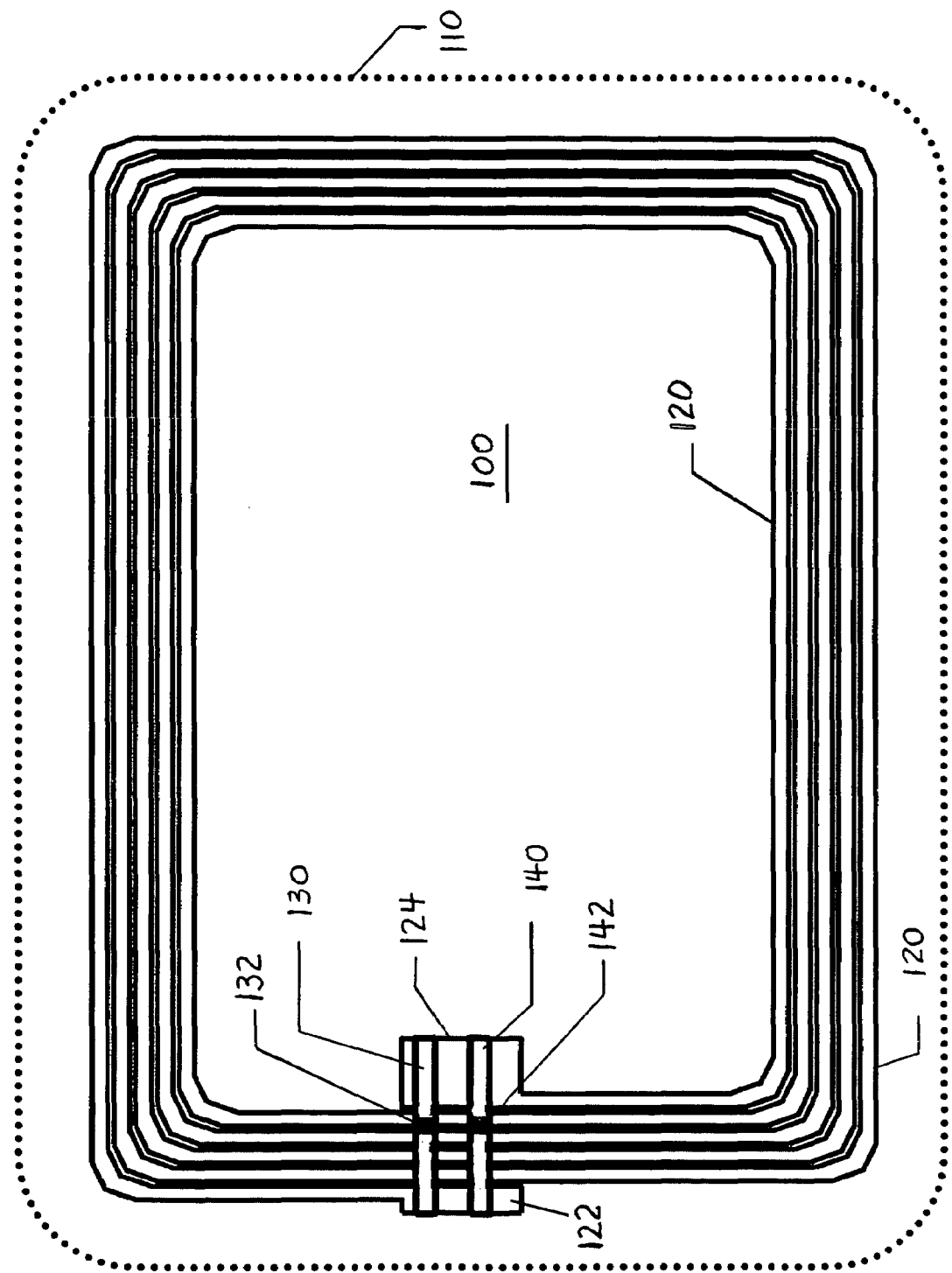
FIG. 2 is a schematic diagram of an example embodiment of a wireless article including two RFID circuits operable at two different conditions.

FIG. 2 is a schematic diagram of an example embodiment of a wireless article 100 including two RFID circuits operable at or under different conditions, i.e. under different communication protocols and/or at different frequencies. Wireless article 100 includes a plural turn loop antenna 120 which is typically of a generally rectangular shape on the broad planar surface of an electrically insulating substrate 110. Two RFID electronic devices 130, 140 are attached between electrical contact sites 122 and 124 generally near opposite ends of the electrical conductor defining antenna 120. RFID electronic devices 130, 140 are operable at two different conditions, e.g., under different communication protocols at the same frequency (band).

Preferably, electronic devices 130, 140 may each comprise an electronic jumper 130, 140 of the sort described in U.S. patent application Ser. No. 10/191,580 filed by Kevin Kwong-Tai Chung on Jul. 9, 2002, entitled "ELECTRONIC CIRCUIT CONSTRUCTION, AS FOR A WIRELESS RF TAG," now U.S. Pat. No. 6,665,193 issued Dec. 16, 2003, which is hereby incorporated herein by reference in its entirety. Such electronic jumpers 130, 140 include an RFID integrated circuit chip 132, 142 mounted thereon as described. Typically, the RFID integrated circuit 132, 142 is mounted to jumper 130, 140 in a flip-chip manner.

Electronic devices 130, 140 may include any other suitable substrate for carrying a suitable RFID integrated circuit 132, 142 and/or may comprise an RFID integrated circuit or circuits 132, 142 directly mounted to the contact sites 122, 124 or to conductors connected thereto, e.g., by soldering or electrically conductive adhesive. Suitable example arrangements are described in U.S. Pat. No. 6,353,420 issued to Kevin Kwong-Tai Chung on Mar. 5, 2003 and entitled "WIRELESS ARTICLE INCLUDING A PLURAL TURN LOOP ANTENNA" and in U.S. Pat. No. 6,404,643 issued to Kevin Kwong-Tai Chung on Jun. 11, 2002 and entitled "ARTICLE HAVING AN EMBEDDED ELECTRONIC DEVICE AND METHOD FOR MAKING SAME," each of which is hereby incorporated herein by reference in its entirety.

Preferably antenna 120 is an etched or otherwise patterned copper conductor having a plurality of generally rectangular loops or turns, and is affixed to insulating substrate 120 in conventional manner. The conductor of antenna 120 is of a length, width, and thickness, suitable for satisfactory operation with electronic devices 130, 140. Where electrical devices 130, 140 are to operate at a frequency whereat antenna 120 is designed to have a plurality of turns, the electrical conductor of antenna 120 will define a lesser number of turns for operation with both electronic devices 130, 140 than for operation with either electronic device 130 or 140 alone.

Substrate 120 is preferably a flexible and durable electrically insulating material, such as the type ESP7450 or other substrate material available from AI Technology, Inc. of Princeton, N.J. Advantageously, type ESP7450 dielectric substrate material can withstand the temperature necessary for soldering electronic devices 130, 140 to contact sites 122, 124, i.e. temperatures of 220° C. and higher, and also has a relatively high dielectric constant, preferably about 4 or greater and typically about 6. Two different types of integrated circuit chips, e.g., including the types mentioned above in relation to FIG. 1, are typically mounted to electronic jumpers 130, 140, respectively.

Other suitable substrate materials include, but are not limited to, polyimide, liquid crystal polymers, and limited flexibility materials such as thin FR-4 substrate material. Preferably, the substrate material is suitable for soldering of an electronic device 130, 140 thereto.

In one example embodiment, an I-Code-2 RFID integrated circuit 132 operating at 13.56 MHz is mounted to electronic device/jumper 130 and a Mifare RFID integrated circuit 142 operating at 13.56 MHz is mounted to electronic device/jumper 140. In this example embodiment, loop antenna 120 typically has about five turns, as compared to typically having about seven to ten turns when intended for use with only one of such electronic devices, on a tag 100 that is typically about 5.1 by 7.6 cm (about 2 by 3 inches) in size. In reducing the number of turns, it is believed preferable to remove turns from the inside of the loops towards the outside, i.e. remove the smaller turns. This was achieved without the need for additional electronic components, such as capacitors and/or inductors, to properly match the two RFID chips 132, 142 and antenna 120. In another embodiment, antenna 120 may have four turns.

It is noted that where different types of RFID chips 130, 140 operating under the same communication protocol are employed, e.g., RFID chips from a different manufacturer, the number of turns of loop antenna 120 may have to be adjusted, typically by increasing or decreasing the number of turns by one, for providing what may be considered "optimized" performance with each of the different RFID devices 130, 140, e.g., for properly interfacing with the internal impedance of the RFID chip 130, 140 utilized. Whenever two RFID devices 130, 140 are employed with one antenna 120, whether both utilize the total loops thereof or only a portion of the loops thereof, the adjustment for "optimizing" performance should be made with both RFID devices connected to the antenna 120.

Thus, two RFID circuits including integrated circuits 132, 142 operating under different communication protocols at the same frequency are connected to and operate with the same loop antenna 120.

Figure 3:
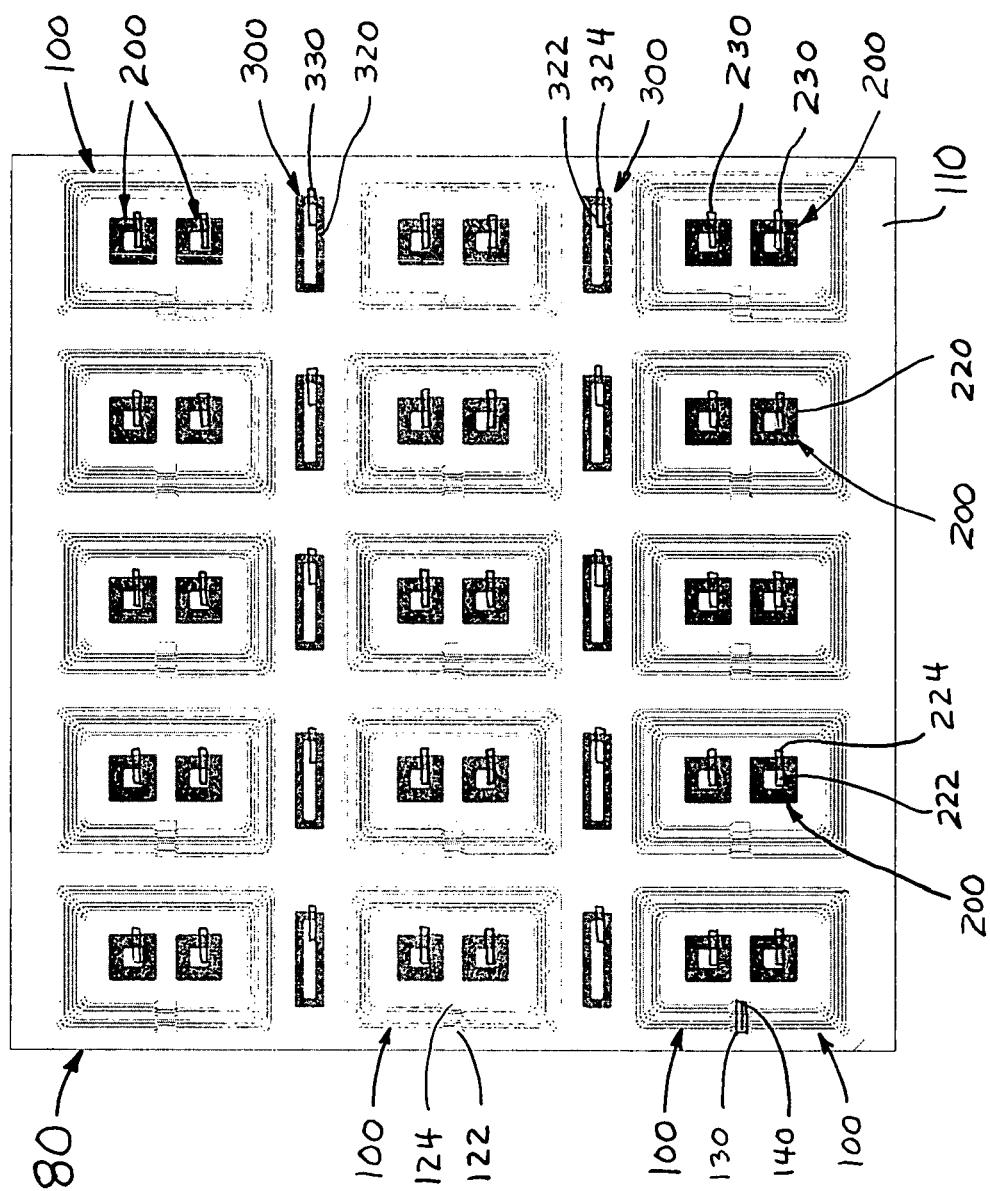
FIG. 3 is a schematic diagram of an example embodiment of a sheet or panel including plural wireless articles wherein at least some of the wireless articles could include RFID circuits operable at two different conditions.

FIG. 3 is a schematic diagram of an example embodiment of a sheet or panel including RFID circuits for plural wireless articles 100, 200, 300 wherein at least some of the wireless articles 100, 200, 300 could include RFID circuits operable at one or more different conditions, i.e. under different communication protocols and/or at different frequencies.

Each wireless article 100 includes a plural turn loop antenna 120 on the broad planar surface of an electrically insulating substrate 110. One or two electronic devices 130, 140 may be connected between electrical contact sites 122 and 124 generally near opposite ends of the electrical conductor defining antenna 120. Preferably, electronic devices 130 and/or 140 each comprise an electronic jumper of the sort described in aforementioned U.S. Pat. No. 6,665,193, including an RFID integrated circuit chip mounted thereon.

Each wireless article 200 includes a plural turn loop antenna 220 on the electrically insulating substrate 110. One electronic device 230 is connected between electrical contact sites 222 and 224 generally near opposite ends of the electrical conductor defining antenna 220. Preferably, electronic device 230 comprises an electronic jumper of the sort described in aforementioned U.S. Pat. No. 6,665,193, including an RFID integrated circuit chip mounted thereon Each wireless article 300 includes a plural turn loop antenna 320 on the electrically insulating substrate 110. One electronic device 330 is connected between electrical contact sites 322 and 324 generally near opposite ends of the electrical conductor defining antenna 320. Preferably, electronic device 330 comprises an electronic jumper of the sort described in aforementioned U.S. Pat. No. 6,665,193, including an RFID integrated circuit chip mounted thereon.

Antenna 120, 220, 320, substrate 110, and electronic jumpers 130, 140, 230, 240, 330, 340 are typically of the types mentioned above in relation to the embodiment of FIG. 2. Preferably, antennas 120, 220, 320 and their respective contact sites 122, 124, 222, 224, 322, 324 are formed by patterning a layer of electrically conductive material that is on substrate 110, such as by conventional etching of a copper layer or depositing a patterned layer of an electrically conductive adhesive. Typically, the same copper layer is utilized for providing all of antennas 120, 220, 320 and so all would be of the same thickness, however, copper layers of different thicknesses could be provided at different locations so that different antennas may be of different thicknesses.

After the copper or other conductive layer is patterned and prepared to receive electronic devices thereon, electronic devices 130, 140, 230, 330 are attached to substrate 110, e.g., by conventional pick-and-place equipment, and connected to the respective contact sites 122, 124, 222, 224, 322, 324, e.g., such as by soldering or by electrically conductive adhesive. Thereafter, substrate 110 is separated into a plurality of smaller substrates each having one or more of RFID circuit tags 100, 200, 300 thereon, as may be desired.

For example, each tag 100 may be separated and have one tag 200 disposed within the area defined by antenna 120, and the other tag 200 therein may be separated for another use. Alternatively, both of tags 200 within the area defined by antenna 120 may be separated from tag 100. Further, e.g., an RFID circuit 100 and an RFID circuit 300 may be separated into a single tag. Separation may be by any suitable method, such as by cutting, laser cutting, die cutting, and the like, and is done in the spaces between the respective RFID circuits or the various RFID tags 100, 200, 300.

If two or more RFID circuits are to be operating at the same frequency, e.g., 13.56 MHz, then the smaller circuits, e.g., 200, 300, should be disposed adjacent the larger circuit 100, rather than inside the loop antenna thereof. If RFID circuits are operating at different frequencies, then the circuit, e.g., 200, 300, having a smaller antenna may be disposed inside of the circuit, e.g., 100, having a larger antenna. Preferably, an arrangement wherein the antenna of one RFID circuit overlaps a substantial area of the antenna of another RFID circuit can reduce the distance at which the tag can be read by a tag reader or interrogator, and so is best avoided; however, some overlap may be allowed if the resulting read distance is considered satisfactory.

One advantage of the foregoing arrangement can be that by placing both related and unrelated tags on the one sheet of substrate 110 material, a greater utilization thereof and a reduction of the waste thereof may be obtained. Another advantage can be that tags having plural electronic devices thereon are made on a common substrate and by a common process, thereby simplifying manufacturing.

Figure 4:
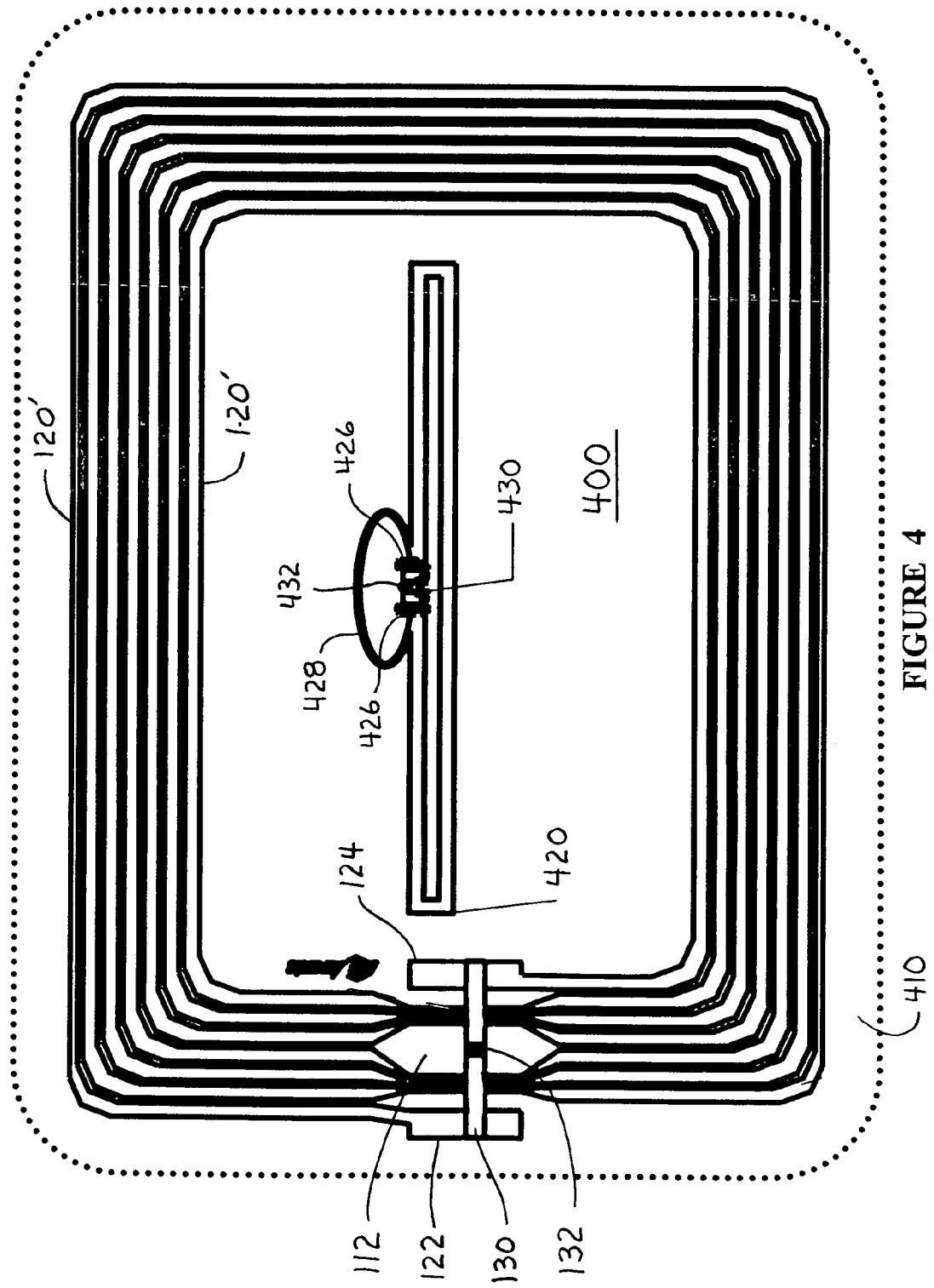
FIG. 4 is a schematic diagram of an example embodiment of a wireless article including two RFID circuits operable at two different conditions.

FIG. 4 is a schematic diagram of an example embodiment of a wireless article 400 including two RFID circuits operable at two different conditions, i.e at different frequencies and/or under different communication protocols. Wireless article 400 includes a first electrical conductor defining a generally rectangular loop antenna 120' having contact sites 122, 124 generally near the respective ends thereof on the broad planar surface of a substrate 410, and an electronic device 130 attached thereto, similarly to article 100 described above in relation to FIG. 2.

In addition, wireless article 400 includes a second electrical conductor defining a single turn generally rectangular loop antenna 420 having contact sites 422, 424 thereon generally near the respective ends thereof on substrate 410. Antenna 420 is disposed within the generally rectangular area defined by antenna 120', and typically is designed to operate with electronic device 430 at a higher frequency than is antenna 120' and electronic device 130, i.e. under two different conditions. Where antenna 420 and device 430 are intended to operate at certain higher frequencies, e.g., 2.45 GHz, antenna 420 may be arranged to have additional features such as narrowed regions 426 providing an inductive reactance and a narrowed region 428 defining a curved conductor around device 430.

Wireless article 400 is preferably made in the manner described above in relation to FIG. 3, e.g., as a plurality of RFID circuits on a sheet or panel of dielectric substrate which is then separated into individual tags, e.g., for manufacturing convenience and economy, as well as for the providing of plural RFID circuits on a common RFID tag substrate.

In one example embodiment, an I-Code-2 RFID integrated circuit 132 operating at 13.56 MHz is mounted to electronic device/jumper 130 and an RFID integrated circuit 432 from SCS of San Diego, Calif., operating at 2.45 GHz is mounted to electronic device/jumper 430.

In this example embodiment, loop antenna 120' typically has about seven turns, and has a region between contact sites 122, 124 wherein the electrical conductor defining antenna 120' is narrow relative to its width in other locations and is positioned towards contact sites 122, 124 so as to leave a region 112 relatively centrally located between contact sites 122, 124 that is free of electrical conductor. Electrical jumper 130 has RFID integrated circuit 132 attached relatively centrally thereon so that when jumper 130 is attached to contact sites 122, 124, RFID integrated circuit 132 is located over region 112. Tag 400 is typically about 5.1 by 7.6 cm (about 2 by 3 inches) in size and may employ the same materials as described above. Antenna 420 is typically about 0.76 by 4.6 cm (about 0.3 by 1.8 inch) in size.

Thus, two RFID integrated circuits 132, 432 operate with respective antenna 120', 420 at two different frequencies, e.g., 13.56 MHz and 2.45 GHz, on the same RFID tag 400, and may operate under the same or under different communication protocols.

Alternatively and optionally, loop antenna 120' of tag 400 could be arranged to have two electronic jumpers 130, 140 connected between contacts 122, 124 as illustrated in FIG. 2 herein so as operate with two different RFID chips 132, 142 under different communication protocols at the same frequency, e.g., 13.56 MHz, in addition to operating with antenna 420 and electronic device 430 at a different higher frequency, e.g., 2.45 GHz. In such case, the number of turns of loop antenna 120' would be reduced appropriately, as described above.

Figure 5:
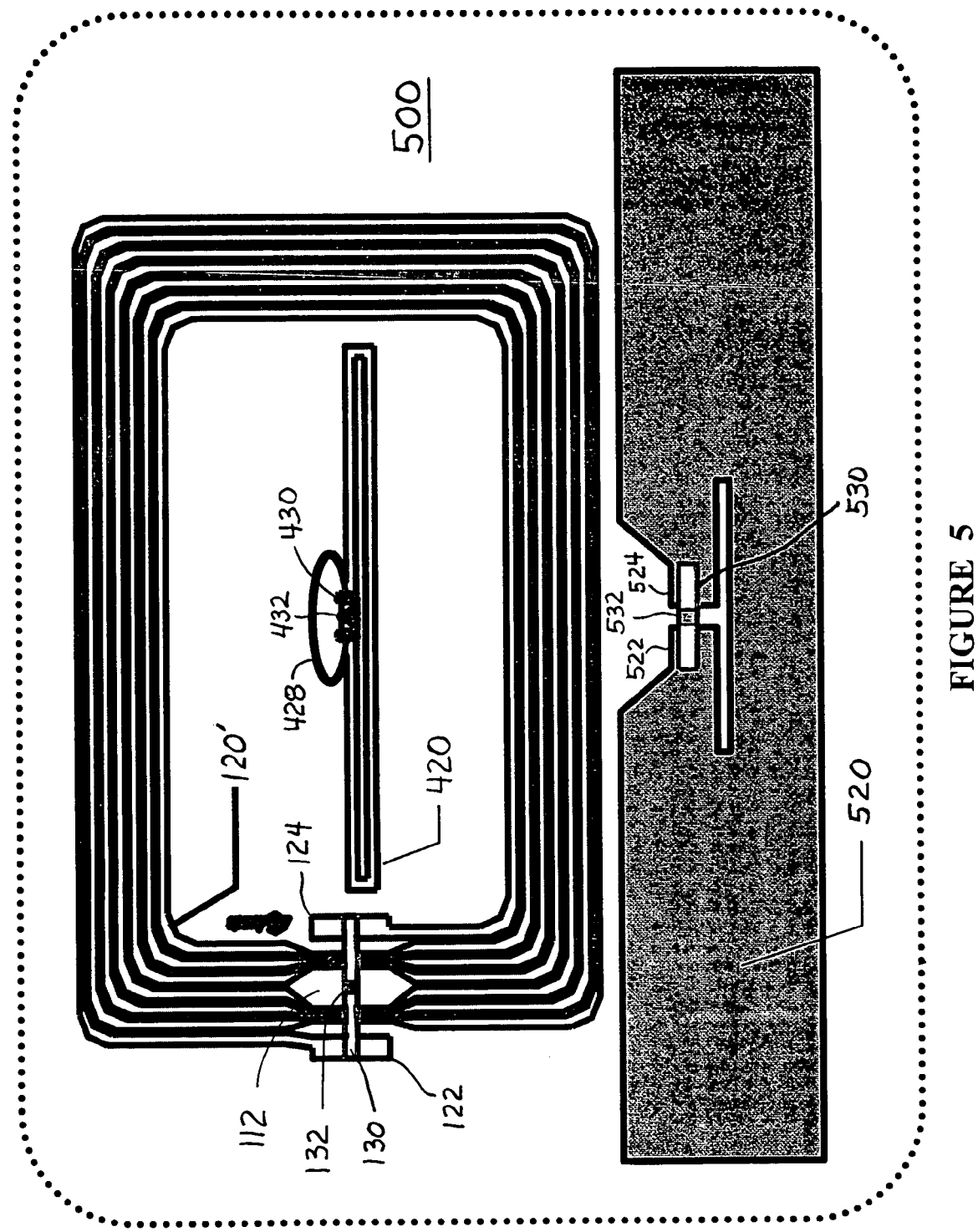
FIG. 5 is a schematic diagram of an example embodiment of a wireless article including two RFID circuits operable at three different conditions.

FIG. 5 is a schematic diagram of an example embodiment of a wireless article 500 including three RFID circuits operable at three different conditions, i.e at different frequencies and/or under different communication protocols. Wireless article 500 includes a first electrical conductor defining a generally rectangular loop antenna 120' having contact sites 122, 124 generally near the respective ends thereof on the broad planar surface of a substrate 510, and a first electronic device 130 attached thereto, similarly to article 100 described above in relation to FIG. 2.

Wireless article 500 also includes a second electrical conductor defining a generally rectangular loop antenna 420 having contact sites 422, 424 generally near the respective ends thereof on a substrate 510, and an electronic device 430 attached thereto. Antenna 420 is disposed within the generally rectangular area defined by antenna 120', and typically is designed to operate with electronic device 430 at a higher frequency than is antenna 120' and electronic device 130, i.e. under two different conditions. Antenna 420 has an electronic device 430 connected between contact sites 422, 424, e.g., operable at 2.45 GHz, similarly to article 400 described above in relation to FIG. 4.

In addition, wireless article 500 includes a third electrical conductor defining a relatively broad or wide single turn generally rectangular loop antenna 520 having contact sites 522, 524 thereon generally near the respective ends thereof on substrate 510. Antenna 520 is disposed adjacently and proximately to generally rectangular antenna 120', and typically is designed to operate with electronic device 530 at a higher frequency than is antenna 120' and electronic device 130, i.e. under a third different condition. Where antenna 520 and device 530 are intended to operate at certain higher frequencies, e.g., 915 MHz, antenna 520 may be arranged to have additional features such as narrowed regions at contact sites 522, 524 providing an appropriate interface with electronic device 530.

Wireless article 500 is preferably made in the manner described above in relation to FIG. 3, e.g., as a plurality of RFID circuits on a sheet or panel of dielectric substrate which is then separated into individual tags, e.g., for manufacturing convenience and economy, as well as for the providing of plural RFID circuits operating under different conditions on a common RFID tag substrate.

In one example embodiment, an I-Code-2 RFID integrated circuit 132 operating at 13.56 MHz is mounted to electronic device/jumper 130, an RFID integrated circuit 432 from SCS of San Diego, Calif., operating at 2.45 GHz is mounted to electronic device/jumper 430, and an RFID integrated circuit 532 from Alien Technology Corp., of San Diego, Calif. or from Matrice, of Maryland, operating at 915 MHz is mounted to electronic device/jumper 530.

In this example embodiment, loop antenna 120' typically has about seven turns, and has a region 112 between contact sites 122, 124 wherein the electrical conductor defining antenna 120' is narrow relative to its width in other locations and is positioned towards contact sites 122, 124 so as to leave a region 112 relatively centrally located between contact sites 122, 124 that is free of electrical conductor. Electrical jumper 130 has RFID integrated circuit 132 attached relatively centrally thereon so that when jumper 130 is attached to contact sites 122, 124, RFID integrated circuit 132 is located over region 112. Tag 500 is typically about 10.2 by 15.2 cm (about 4 by 6 inches) in size and may employ the same materials as described above. Antenna 520 is typically about 2.5 by 12.7 cm (about 1 by 5 inches) in size.

Thus, three RFID integrated circuits 132, 432, 532 operate with respective antenna 120', 420, 520 at three different frequencies, e.g., 13.56 MHz, 915 MHz, and 2.45 GHz, on the same RFID tag 500, and may operate under the same or under different communication protocols.

Figure 6A:
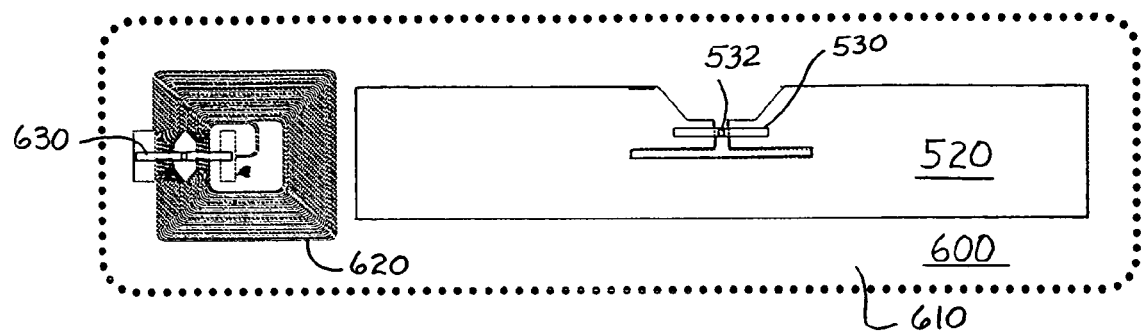
FIGS. 6A and 6B are a schematic diagram of an example embodiment of a wireless article including two RFID circuits operable at two different conditions and a detail of a portion thereof, respectively.
Figure 6B:
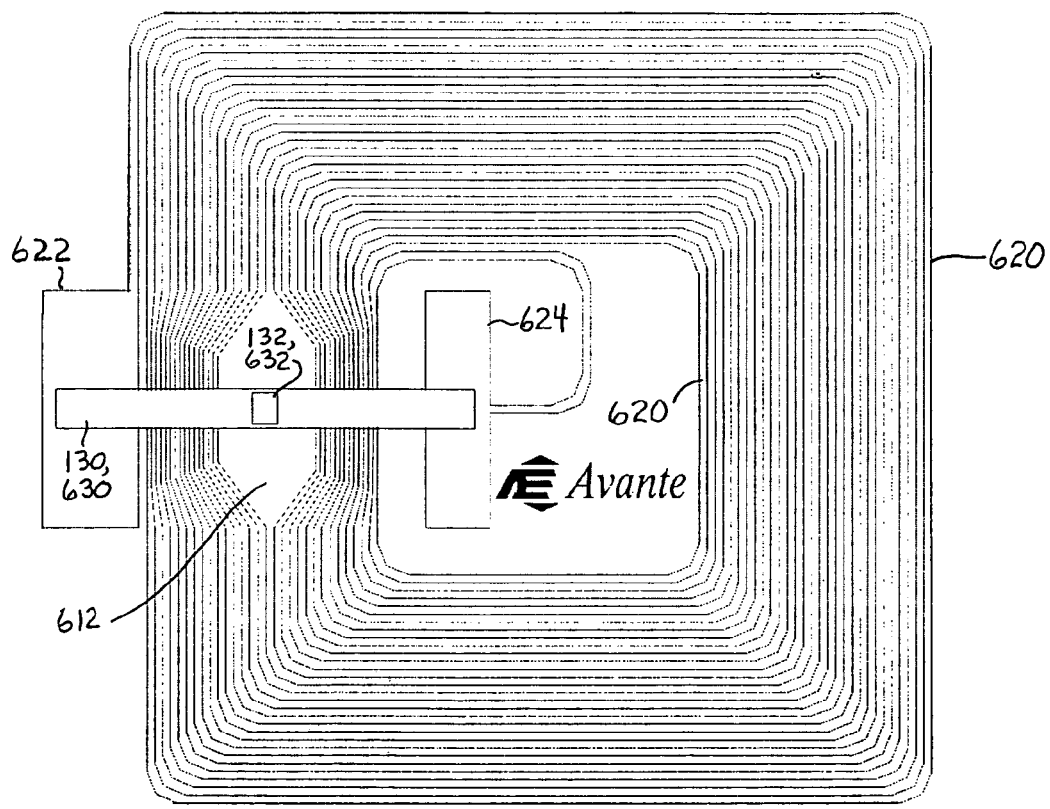

FIGS. 6A and 6B are a schematic diagram of an example embodiment of a wireless article 600 including two RFID circuits operable at two different conditions and a detail of a portion thereof, respectively.

Wireless article 600 includes an electrical conductor defining a relatively broad or wide single turn generally rectangular loop antenna 520 having contact sites 522, 524 thereon generally near the respective ends thereof on the broad planar surface of substrate 610. Antenna 520 is disposed adjacently and proximately to generally rectangular antenna 620, and typically is designed to operate with electronic device 530 at a higher frequency than is antenna 620 and electronic device 630. Where antenna 520 and device 530 are intended to operate at certain higher frequencies, e.g., 915 MHz, antenna 520 may be arranged to have additional features such as narrowed regions at contact sites 522, 524 providing an appropriate interface with electronic device 530.

Wireless article 600 also includes a second electrical conductor defining a generally rectangular loop antenna 620, shown in greater detail in FIG. 6B, having contact sites 622, 624 generally near the respective ends thereof on a substrate 610, and an electronic device 630 attached thereto. Antenna 620 is typically designed to operate with electronic device 630 at a relatively lower frequency, e.g., 13.56 MHz, as is antenna 120' and electronic device 130, in which case electronic device may be an electronic device 130 or 140 as described above.

Because wireless article 600 is narrower than is wireless article 100 described above, antenna 620 typically will have a greater number of turns so as to properly match electronic device 630 than if the loops were larger in size. In this example embodiment, loop antenna 620 typically has about 15-20 turns where RFID device 630 operates at 13.56 MHz, and may have a region between contact sites 622, 624 wherein the electrical conductor defining antenna 620 is narrow relative to its width in other locations and is positioned towards contact sites 622, 624 so as to leave a region 612 relatively centrally located between contact sites 622, 624 that is free of electrical conductor. Electrical jumper 630 has RFID integrated circuit 632 attached relatively centrally thereon so that when jumper 630 is attached to contact sites 622, 624, RFID integrated circuit 632 is located over region 612.

Wireless article 600 is preferably made in the manner described above in relation to FIG. 3, e.g., as a plurality of RFID circuits on a sheet or panel of dielectric substrate which is then separated into individual tags, e.g., for manufacturing convenience and economy, as well as for the providing of plural RFID circuits operating under different conditions on a common RFID tag substrate.

In one example embodiment, an I-Code-2 or Mifare RFID integrated circuit 132 operating at 13.56 MHz is mounted to electronic device/jumper 630 and an RFID integrated circuit 432 from Alien Technology Corp., of California, or from Matrice, of Maryland, operating at 915 MHz is mounted to electronic device/jumper 530. Tag 600 is typically about 2.5 by 15.2 cm (about 1 by 6 inches) in size and may employ the same materials as described above. Antenna 620 is typically about 2.5 by 2.5 cm (about 1 by 1 inch) in size.

Thus, two RFID integrated circuits 632, 532 operate with respective antenna 620, 520 at two different frequencies on the same RFID tag 600, and may operate under the same or under different communication protocols.

Figure 7:
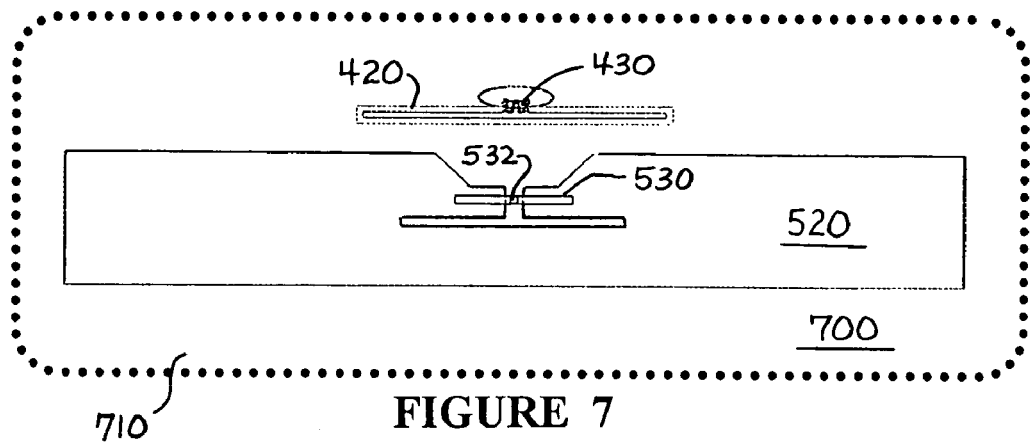
FIG. 7 is a schematic diagram of an example embodiment of a wireless article including two RFID circuits operable at two different conditions.

FIG. 7 is a schematic diagram of an example embodiment of a wireless article 700 including two RFID circuits operable at two different conditions, i.e at different frequencies and/or under different communication protocols. Wireless article 700 includes an electrical conductor defining a single turn generally rectangular loop antenna 420 having contact sites 422, 424 thereon generally near the respective ends thereof on the broad planar surface of substrate 710. Where antenna 420 and device 430 are intended to operate at certain higher frequencies, e.g., 2.45 GHz, antenna 420 may be arranged to have additional features such as narrowed regions 426 providing an inductive reactance and a narrowed region 428 defining a curved conductor around device 430, as described above.

Wireless article 700 also includes an electrical conductor defining a relatively broad or wide single turn generally rectangular loop antenna 520 having contact sites 522, 524 thereon generally near the respective ends thereof on substrate 610. Antenna 520 is disposed adjacently and proximately to generally rectangular antenna 420, and typically is designed to operate with electronic device 530 at a lower frequency than is antenna 620 and electronic device 630. Where antenna 520 and device 530 are intended to operate at certain higher frequencies, e.g., 915 MHz, antenna 520 may be arranged to have additional features such as narrowed regions at contact sites 522, 524 providing an appropriate interface with electronic device 530.

Wireless article 700 is preferably made in the manner described above in relation to FIG. 3, e.g., as a plurality of RFID circuits on a sheet or panel of dielectric substrate which is then separated into individual tags, e.g., for manufacturing convenience and economy, as well as for the providing of plural RFID circuits operating under different conditions on a common RFID tag substrate.

In one example embodiment, an integrated circuit 132 from Matrice, of Maryland, or from Alien Technology Corp., of California, operating at 915 MHz is mounted to electronic device/jumper 130 and an RFID integrated circuit 432 from SCS, of California, operating at 2.45 GHz is mounted to electronic device/jumper 430. Tag 700 is typically about 3.8 by 15.2 cm (about 1.5 by 6 inches) in size and may employ the same materials as described above.

Thus, two RFID integrated circuits 432, 532 operate with respective antenna 420, 520 at two different frequencies on the same RFID tag 700, and may operate under the same or under different communication protocols.

Figure 8:
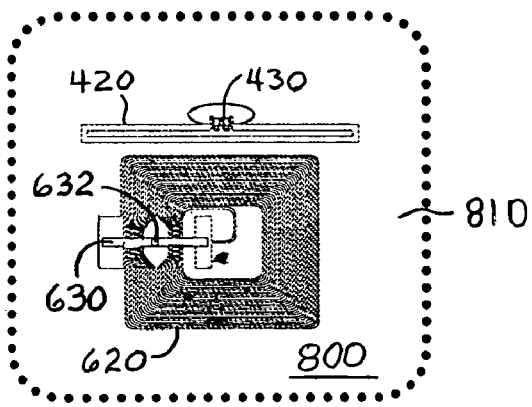
FIG. 8 is a schematic diagram of an example embodiment of a wireless article including two RFID circuits operable at two different conditions.

FIG. 8 is a schematic diagram of an example embodiment of a wireless article 800 including two RFID circuits operable at two different conditions, i.e at different frequencies and/or under different communication protocols. Wireless article 800 includes an electrical conductor defining a single turn generally rectangular loop antenna 420 having contact sites 422, 424 thereon generally near the respective ends thereof on the broad planar surface of substrate 810. Where antenna 420 and device 430 are intended to operate at certain higher frequencies, e.g., 2.45 GHz, antenna 420 may be arranged to have additional features such as narrowed regions 426 providing an inductive reactance and a narrowed region 428 defining a curved conductor around device 430.

Wireless article 800 also includes a second electrical conductor defining a generally rectangular loop antenna 620, having contact sites 622, 624 generally near the respective ends thereof on a substrate 810, and an electronic device 630 attached thereto. Antenna 620 is typically designed to operate with electronic device 630 at a relatively lower frequency, e.g., 13.56 MHz, as is antenna 120' and electronic device 130, in which case electronic device may be an electronic device 130 or 140 as described above.

Loop antenna 620 typically has about 15-20 turns where device 630 operates at 13.56 MHz, and may have a region between contact sites 622, 624 wherein the electrical conductor defining antenna 620 is narrow relative to its width in other locations and is positioned towards contact sites 622, 624 so as to leave a region 612 relatively centrally located between contact sites 622, 624 that is free of electrical conductor. Electrical jumper 630 has RFID integrated circuit 632 attached relatively centrally thereon so that when jumper 630 is attached to contact sites 622, 624, RFID integrated circuit 632 is located over region 612.

Wireless article 800 is preferably made in the manner described above in relation to FIG. 3, e.g., as a plurality of RFID circuits on a sheet or panel of dielectric substrate which is then separated into individual tags, e.g., for manufacturing convenience and economy, as well as for the providing of plural RFID circuits operating under different conditions on a common RFID tag substrate.

In one example embodiment, an I-Code-2 RFID integrated circuit 632 operating at 13.56 MHz is mounted to electronic device/jumper 630 and an RFID integrated circuit 432 from SCS, of California, operating at 2.45 GHz is mounted to electronic device/jumper 430. Tag 800 is typically about 5 by 5 cm (about 2 by 2 inches) in size and may employ the same materials as described above.

Thus, two RFID integrated circuits 432, 632 operate with respective antenna 420, 620 at two different frequencies on the same RFID tag 800, and may operate under the same or under different communication protocols.

Figure 9:
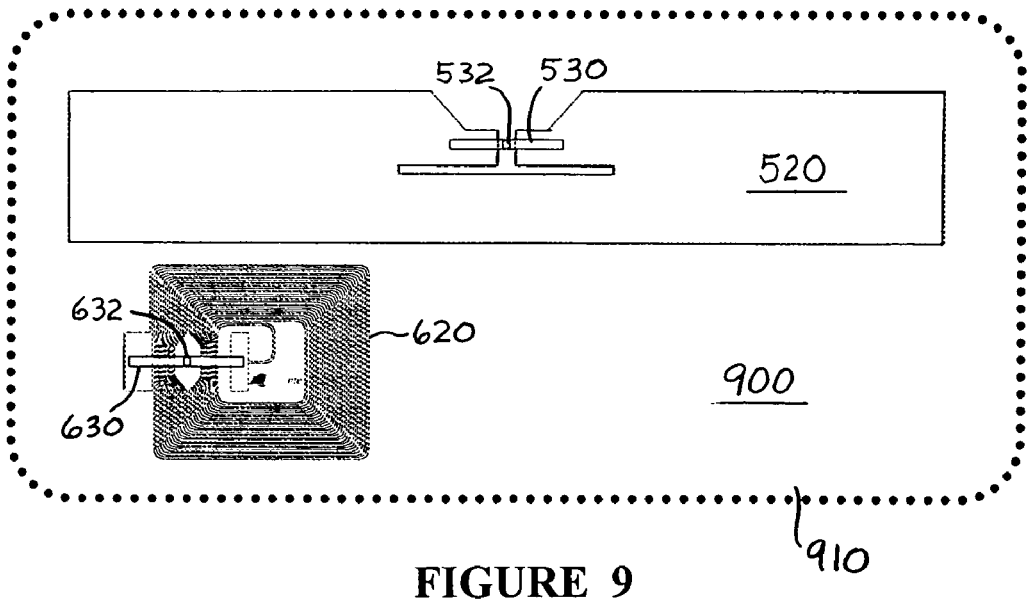
FIG. 9 is a schematic diagram of an example embodiment of a wireless article including two RFID circuits operable at two different conditions.

FIG. 9 is a schematic diagram of an example embodiment of a wireless article 900 including two RFID circuits operable at two different condition, i.e at different frequencies and/or under different communication protocols. Wireless article 900 includes an electrical conductor defining a relatively broad or wide single turn generally rectangular loop antenna 520 having contact sites 522, 524 thereon generally near the respective ends thereof on the broad planar surface of substrate 910. Antenna 520 is disposed adjacently and proximately to generally rectangular antenna 620, and typically is designed to operate with electronic device 530 at a higher frequency than is antenna 620 and electronic device 630. Where antenna 520 and device 530 are intended to operate at certain higher frequencies, e.g., 915 MHz, antenna 520 may be arranged to have additional features such as narrowed regions at contact sites 522, 524 providing an appropriate interface with electronic device 530.

Wireless article 900 also includes a second electrical conductor defining a generally rectangular loop antenna 620 having contact sites 622, 624 generally near the respective ends thereof on a substrate 910, and an electronic device 630 attached thereto. Antenna 620 is typically designed to operate with electronic device 630 at a relatively lower frequency, e.g., 13.56 MHz, in which case electronic device may be an electronic device 130 or 140 described above.

Antenna 620 typically will have a greater number of turns so as to properly match electronic device 630 than if the loops were larger in size. In this example embodiment, loop antenna 620 typically has about 15-20 turns where device 630 operates at 13.56 MHz, and may have a region between contact sites 622, 624 wherein the electrical conductor defining antenna 620 is narrow relative to its width in other locations and is positioned towards contact sites 622, 624 so as to leave a region 612 relatively centrally located between contact sites 622, 624 that is free of electrical conductor. Electrical jumper 630 has RFID integrated circuit 632 attached relatively centrally thereon so that when jumper 630 is attached to contact sites 622, 624, RFID integrated circuit 632 is located over region 612.

Wireless article 900 is preferably made in the manner described above in relation to FIG. 3, e.g., as a plurality of RFID circuits on a sheet or panel of dielectric substrate which is then separated into individual tags, e.g., for manufacturing convenience and economy, as well as for the providing of plural RFID circuits operating under different conditions on a common RFID tag substrate.

In one example embodiment, an I-Code-2 RFID integrated circuit 632 operating at 13.56 MHz is mounted to electronic device/jumper 630 and an RFID integrated circuit 532 from Matrice, of Maryland, or from Alien Technology Corp., of California, operating at 915 GHz is mounted to electronic device/jumper 430. Tag 900 is typically about 7.6 by 12.7 cm (about 3 by 5 inches) in size.

Thus, two RFID integrated circuits 532, 632 operate with respective antenna 520, 620 at two different frequencies on the same RFID tag 900, and may operate under the same or under different communication protocols.

The RFID wireless article(s) described herein may be employed for any utilization amenable to RFID identification and/or tracking, including, but not limited to, identification, security monitoring, access control, a banking transaction, a financial transaction, a credit card, cash card and/or debit card, inventory tracking and/or control, theft detection and/or loss monitoring, tracking and/or control of luggage, baggage, packages and/or merchandise, garage and/or parking yard access, labels for CDs, DVDs and other products. Further, the utilization may be a secure application, such as for access to a controlled area or banking or other financial transaction, or for more casual and non-critical applications, such as inventory tracking and control, garage and parking yard access and the like.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such.

While the present invention has been described in terms of the foregoing example embodiments, variations within the scope and spirit of the present invention as defined by the claims following will be apparent to those skilled in the art. For example, the RFID electronic devices utilized with the wireless articles of the present arrangement may be relatively simple, e.g., having a small memory and little processing capability as might be employed for a simple and non-secure task, or may be complex, having several memories of different types and sizes and a processor having substantial computing capability as may be employed for high security and identification tasks, or may be of any other capability. The wireless articles may store information including, but not limited to, digitized pictures, biometric data, such as a finger scan, a fingerprint, an eye scan, and/or a digitized signature, and the like.

In addition, the RFID electronic devices utilized may be of the so-called active or passive types, i.e may be powered by a battery or other power source or may be powered by the energy contained in interrogating signals from an RFID tag reader or an RFID interrogator or may be both active and passive. Combinations of types and applications of RFID may be provided in a particular wireless article, e.g., an RFID device with an relatively long read distance may be utilized to identify the article or object with which it is associated and an RFID device having a shorter read distance may be utilized to provide detailed manifests, travel and/or process history, and the like.

An antenna, or an RFID tag or wireless article, may be considered generally rectangular even though it is curved along its sides or edges, is curved at or near its corners, and/or has opposing sides or edges that are otherwise not parallel.

Radio frequency (RF) as is used herein refers to any frequency at which communication by electromagnetic radiation may be made, irrespective of the frequency band of the spectrum in which it may otherwise be considered. In addition, while a particular frequency may be mentioned, it is understood that operation is typically at any frequency within a band of frequencies that includes the frequency mentioned. For example, the frequency "915 MHz" typically refers to a band of frequencies between about 890 MHz and about 920 MHz.

Similarly, the terms "tag" and "smart tag" include a tag, card, badge, label, and any other form or object that may include an electronic device and an antenna suitable for RF communication, and the foregoing terms as well as the term "wireless article" are intended to encompass any and all forms thereof.

What is claimed is:

1. A wireless article comprising:
a dielectric substrate having a broad planar surface;
at least one antenna on the broad planar surface of said dielectric substrate, said at least one antenna including at least one electrical conductor defining at least one loop and defining at least first and second contacts thereof; and
at least two RFID electronic devices disposed proximate said dielectric substrate and electrically connected to the at least first and second contacts of said at least one antenna,
wherein said at least two RFID electronic devices operate under different protocols and/or at different frequency bands, and
wherein said at least one antenna defines a lesser number of turns than that for operating either of said at least two RFID electronic devices alone.

2. The wireless article of claim 1 wherein at least one of said at least two RFID electronic devices comprises an electronic jumper connected between the at least first and second contact sites of said at least one antenna and an RFID integrated circuit mounted to said electronic jumper.

3. The wireless article of claim 1 wherein said at least two RFID electronic devices operate under different protocols at the same frequency.

4. The wireless article of claim 3 wherein the frequency is in a band including one of 13.56 MHz, 915 MHz and 2.45 GHz.

5. The wireless article of claim 1 wherein said at least one antenna comprises first and second electrical conductors defining respective first and second loop antennas each having the first and second contacts thereof, and wherein said at least two RFID electronic devices are respectively coupled between the at least first and second contacts of said first and second loop antennas, respectively.

6. The wireless article of claim 1 wherein the at least one loop of said at least one antenna is generally rectangular.

7. The wireless article of claim 1 wherein the frequency is in a band including one of 13.56 MHz, 915 MHz and 2.45 GHz.

8. The wireless article of claim 1 further comprising:
a further antenna on the broad planar surface of said dielectric substrate, said further antenna including an electrical conductor defining at least one loop and defining first and second contacts thereof; and
a further RFID electronic device disposed proximate said dielectric substrate and electrically connected to the first and second contacts of said further antenna,
wherein said further RFID electronic device operates at a different frequency than do either of said at least two RFID electronic devices.

9. The wireless article of claim 1 wherein a plurality of the wireless articles recited in claim 1 are disposed on a broad planar surface of a sheet of said dielectric substrate and wherein said sheet of said dielectric substrate is thereafter cut to provide a plurality of said wireless articles.

10. The wireless article of claim 1 for utilization for identification, security monitoring, access control, a secure transaction, a banking transaction, a financial transaction, a credit card, cash card and/or debit card, inventory tracking and/or control, theft detection and/or loss monitoring, tracking and/or control of luggage, baggage, packages and/or merchandise, garage and/or parking yard access, a product label, and/or a label for a CD and/or DVD.

11. A wireless article comprising:
a dielectric substrate having a broad planar surface;
an antenna on the broad planar surface of said dielectric substrate, said antenna including an electrical conductor defining a plurality of loops and defining first and second contacts thereof; and
first and second RFID electronic devices disposed proximate said dielectric substrate and electrically connected in parallel between the first and second contacts of said antenna,
wherein said first and second RFID electronic devices operate under different protocols, and
wherein said antenna defines a lesser number of turns than that for operating either of said first and second RFID electronic devices alone.

12. The wireless article of claim 11 wherein each of said first and second RFID electronic devices comprises an electronic jumper connected between said first and second contact sites of said antenna and an RFID integrated circuit mounted to said electronic jumper.

13. The wireless article of claim 11 wherein said first and second RFID electronic devices operate under different protocols at the same frequency.

14. The wireless article of claim 13 wherein the frequency is in a band including one of 13.56 MHz, 915 MHz and 2.45 GHz.

15. The wireless article of claim 11 wherein said first and second RFID electronic devices respectively operate at a same or different frequency in a band including one of 13.56 MHz, 915 MHz and 2.45 GHz.

16. The wireless article of claim 11 wherein the plurality of loops of said antenna is generally rectangular.

17. A wireless article comprising:
a dielectric substrate having a broad planar surface;
an antenna on the broad planar surface of said dielectric substrate, said antenna including an electrical conductor defining a plurality of loops and defining first and second contacts thereof;
first and second RFID electronic devices disposed proximate said dielectric substrate and electrically connected in parallel between the first and second contacts of said antenna,
wherein said first and second RFID electronic devices operate under different protocols;
a further antenna on the broad planar surface of said dielectric substrate, said further antenna including an electrical conductor defining at least one loop and defining first and second contacts thereof; and
a third RFID electronic device disposed proximate said dielectric substrate and electrically connected to the first and second contacts of said further antenna, wherein said third RFID electronic device operates at a different frequency than do said first and second RFID electronic devices.

18. The wireless article of claim 11 wherein a plurality of the wireless articles recited in claim 11 are disposed on a broad planar surface of a sheet of said dielectric substrate and wherein said sheet of said dielectric substrate is thereafter cut to provide a plurality of said wireless articles.

19. The wireless article of claim 11 wherein the lesser number of turns is less than the number of turns that would provide substantially equivalent read distance for either one of said first and second RFID electronic devices alone.

20. The wireless article of claim 11 for utilization for identification, security monitoring, access control, a secure transaction, a banking transaction, a financial transaction, a credit card, cash card and/or debit card, inventory tracking and/or control, theft detection and/or loss monitoring, tracking and/or control of luggage, baggage, packages and/or merchandise, garage and/or parking yard access, a product label, and/or a label for a CD and/or DVD.

21. A wireless article comprising:
a dielectric substrate having a broad planar surface;
plural antennas on the broad planar surface of said dielectric substrate, said antennas including first and second electrical conductors defining first and second loops and defining respective first and second contacts of each of the first and second loops; and
first and second RFID electronic devices disposed proximate said dielectric substrate, wherein said first RFID electronic device is electrically connected to the first and second contacts of the first loop of said antennas and wherein said second RFID electronic device is electrically connected to the first and second contacts of the second loop of said, antennas,
wherein said first and second RFID electronic devices operate at different frequency bands.

22. The wireless article of claim 21 wherein at least one of said first and second RFID electronic devices comprises an electronic jumper connected between said first and second contacts of one loop of said antenna and an RFID integrated circuit mounted to said electronic jumper.

23. The wireless article of claim 21 wherein said first and second RFID electronic devices operate under different protocols.

24. The wireless article of claim 21 wherein the different frequency bands including any two of 13.56 MHz, 915 MHz and 2.45 GHz.

25. The wireless article of claim 21 wherein the at least one of the first and second loops of said antennas is generally rectangular.

26. The wireless article of claim 21 further comprising:
a third loop of said antennas on the broad planar surface of said dielectric substrate, said third loop including an electrical conductor defining at least one loop and defining first and second contacts thereof; and
a third RFID electronic device disposed proximate said dielectric substrate and electrically connected to the first and second contacts of said third loop of said antennas, wherein said further RFID electronic device operates at a different frequency than do either of said first and second RFID electronic devices.

27. The wireless article of claim 21 wherein a plurality of the wireless articles recited in claim 21 are disposed on a broad planar surface of a sheet of said dielectric substrate and wherein said sheet of said dielectric substrate is thereafter cut to provide a plurality of said wireless articles.

28. The wireless article of claim 21 for utilization for identification, security monitoring, access control, a secure transaction, a banking transaction, a financial transaction, a credit card, cash card and/or debit card, inventory tracking and/or control, theft detection and/or loss monitoring, tracking and/or control of luggage, baggage, packages and/or merchandise, garage and/or parking yard access, a product label, and/or a label for a CD and/or DVD.

29. A method for making a plurality of wireless articles operable at or under two different conditions comprising:
   providing a dielectric substrate sheet;
   patterning on the dielectric substrate sheet a plurality of circuits, each of the plurality of circuits including an electrical conductor defining a loop antenna having first and second electrical contacts;
   then mounting a plurality of electronic RFID devices on the dielectric substrate sheet, each of the electronic devices being electrically connected between the first and second electrical contacts of a respective one of the loop antennas, wherein each one of the electronic RFID devices is connected to one of the loop antenna,
   wherein at least one of the loop antennas and the electronic RFID device connected thereto is operable at a different condition than is another of the loop antennas and the electronic RFID device connected thereto,
   whereby each of the loop antennas and the electronic RFID device connected thereto provide an RFID circuit;
   thereafter, cutting the dielectric substrate sheet into a plurality of wireless article substrates each including at least one loop antenna and at least one electronic RFID device, the loop antenna and electronic RFID device providing an RFID circuit operable under a given condition,
   wherein at least one of the plurality of wireless article substrates includes one or more loop antennas and two or more RFID devices providing an RFID circuit operable under two different given conditions.

30. The method of claim 29 wherein the at least one of the plurality of wireless article substrates includes one loop antenna and more than one electronic RFID device, the loop antenna and more than one electronic RFID device providing an RFID circuit operable at the same frequency under two different protocols.

31. The method of claim 29 wherein the at least one of the plurality of wireless article substrates includes two loop antennas and two electronic RFID devices, the two loop antennas and two electronic RFID devices providing two RFID circuits operable at two different frequency bands.

32. The method of claim 29 wherein said mounting comprises soldering connections or forming electrically conductive adhesive connections between contacts of the electronic RFID device and the first and second electrical contacts of a respective one of the loop antenna.

33. A method for making a plurality of wireless articles comprising:
   providing a dielectric substrate sheet;
   patterning on the dielectric substrate sheet a plurality of circuits, each of the plurality of circuits including an electrical conductor defining a loop antenna having first and second electrical contacts,
   wherein ones of the loop antennas are relatively larger and others of the loop antennas are relatively smaller, and wherein at least one of the relatively smaller loop antennas is disposed within a respective one of the relatively larger loop; antennas;
   then mounting a plurality of electronic RFID devices on the dielectric substrate sheet, each of the electronic devices being electrically connected between the first and second electrical contacts of a respective one of the loop antennas, wherein each one of the electronic RFID devices is connected to one of the loop antenna,
   whereby each of the loop antennas and the electronic RFID device connected thereto provide an RFID circuit;
   thereafter, cutting the dielectric substrate sheet into a plurality of wireless article substrates each including at least one loop antenna and at least one electronic RFID device, the loop antenna and electronic RFID device providing an RFID circuit operable under a given condition,
   wherein the RFID circuit including a relatively smaller loop antenna is either separated from the RFID circuit including a relatively larger circuit to provide separate wireless articles or is not separated from the RFID circuit including a relatively larger circuit to provide a wireless article substrate having at least two RFID circuits thereon.

34. The method of claim 33 wherein at least one of the plurality of wireless article substrates includes one or more loop antennas and two or more RFID devices providing an RFID circuit operable under two different given conditions.

35. The method of claim 33 wherein at least one of the loop antennas and the electronic RFID device connected thereto is operable at a different condition than is another of the loop antennas and the electronic RFID device connected thereto.

36. The method of claim 33 wherein the at least one of the plurality of wireless article substrates includes one loop antenna and more than one electronic RFID device, the loop antenna and more than one electronic RFID device providing an RFID circuit operable at the same frequency under two different protocols.

37. The method of claim 33 wherein the at least one of the plurality of wireless article substrates includes two loop antennas and two electronic RFID devices, the two loop antennas and two electronic RFID devices providing two RFID circuits operable at two different frequency bands.

38. The method of claim 33 wherein said mounting comprises soldering connections or forming electrically conductive adhesive connections between contacts of the electronic RFID device and the first and second electrical contacts of a respective one of the loop antenna.

* * * * *